United States Patent Office 3,592,688
Patented July 13, 1971

3,592,688
DEXTROSE CRYSTALLIZATION PROCESS
George Rhoades Dean, Edwardsville, and Ronald Emmett Pyle, Granite City, Ill., assignors to Miles Laboratories, Inc.
No Drawing. Filed Sept. 10, 1969, Ser. No. 856,806
Int. Cl. C13k 1/10
U.S. Cl. 127—60                                11 Claims

ABSTRACT OF THE DISCLOSURE

Relatively large crystals of dextrose hydrate can be consistently produced by a process which comprises contacting a supersaturated solution of dextrose with dextrose hydrate seed crystals at a temperature below about 90° F., maintaining the temperature of the dextrose solution in contact with the seed crystals below about 90° F. during dextrose crystallization to form a massecuite and recovering crystals of dextrose hydrate from such massecuite.

BACKGROUND AND PRIOR ART

It is well-known in the art that dextrose hydrate crystals can be produced by contacting a dextrose-containing solution with dextrose hydrate seed crystals under crystallization temperatures to form a massecuite consisting of a mixture of crystals and mother liquor and then separating the crystals from the mother liquor. The crystallization temperatures disclosed in the prior art for production of dextrose hydrate crystals have been in the range from about 68° F. (20° C.) to about 130° F. (54° C.). Generally the prior art crystallization temperature was in the range from about 90° F. (32° C.) to about 105° F. (40° C.). Whenever crystallization temperatures below about 90° F. are mentioned, the initial temperature is above 90° F. and then the temperature is lowered over several days to a value below 90° F. The overall crystallization time using prior art conditions was generally about 96–120 hours.

The prior art dextrose hydrate crystallization processes, in addition to requiring excessively long crystallization times which also require large volumes of crystallizers for commercial scale of operation, all had the disadvantage that the final crystal product was generally of relatively small crystal size. This relatively small crystal size was undesirable from the standpoint of eventual use of the dextrose crystals, and it also interfered with recovery of the crystals from the massecuite. Considerable efforts have been expended in the prior art to increase the size of the dextrose hydrate crystal product, but as yet such efforts have not been commercially successful.

SUMMARY OF THE INVENTION

In accordance with the present invention, a process is provided for the production of relatively large crystals of dextrose hydrate which comprises contacting a supersaturated solution of dextrose with dextrose hydrate seed crystals at a temperature below about 90° F., maintaining the temperature of the dextrose solution in contact with the seed crystals below about 90° F. during dextrose crystallization to form a massecuite and recovering crystals of dextrose hydrate from such massecuite.

DESCRIPTION OF THE PREFERRED EMBODIMENTS

It has been found that dextrose hydrate crystals can exist in two separate and disinct crystal phases. Phase I, when grown from Phase I seed crystals, is generally pentagonal in shape and can grow to a relatively large size. It is stable at temperatures below about 90° F. Phase II is generally in the form of relatively small, elongated, thin lath-type crystals and is stable at temperatures above about 100° F. In the temperature range from about 90° F. to about 100° F. both Phase I and Phase II crystals can exist. Phase I and II crystals can also be distinguished from each other by polarized light. When mounted in a medium having a refractive index of 1.541 and placed at right angles to the plane of polarization of polarized light, Phase I crystals are invisible, but Phase II crystals are distinctly visible and are faintly blue in color.

If a supersaturated dextrose solution is cooled to a crystallization temperature above about 100° F. according to well-known prior art producers, the only dextrose hydrate crystals that can be formed will be of Phase II, no matter what type of dextrose hydrate crystals are employed as seed crystals. If Phase I seed crystals are employed, they will dissolve at these temperatures and be converted to Phase II crystals. The resulting dextrose hydrate crystalline product will consist entirely of relatively small lath-type crystals.

If the initial crystallization temperature is above about 100° F. and is then gradually reduced to a value below about 90° F. according to well-known prior art procedures, the initially formed lath-type Phase II crystals will be converted to lath-type Phase I crystals which are still relatively small in size.

If the crystallization temperature is in the range from about 90° F. to about 100° F. or initially is in this range and then is gradually cooled to a temperature below about 90° F. according to well-known prior art procedures, a mixture of Phase I and Phase II crystals will be initially formed. The Phase I crystals might be in the desirable pentagonal shape which can grow to a relatively large size. The Phase II crystals, which will convert to Phase I crystals below about 90° F., will be of the relatively small lath-type shape. The resulting product at best will consist of a mixture of large and small crystals. If the massecuite is maintained at temperatures above 90° F. for any appreciable period of time, substantially all of the crystalline product will consist of relatively small lath-type crystals.

The disadvantages of the above-discussed prior art procedures can be overcome by the novel process of carrying out the entire crystallization process at a temperature below about 90° F. In this way the relatively small, lath-type Phase II crystals never have an opportunity to form. Phase I crystals of dextrose hydrate are also preferably employed as seed crystals for this process to produce crystals of relatively large size.

In carrying out the process of the present invention, a supersaturated solution of dextrose is contacted with dextrose hydrate seed crystals at a temperature below about 90° F. The supersaturated condition of the dextrose solution can be obtained in several ways. First, the entire solution which is in a saturated or undersaturated condition at a temperature above about 90° F. could be cooled to a temperature below about 90° F. before contacting the seed crystals. Second, the dextrose solution which is in a saturated or undersaturated condition at a temperature below about 90° F. could be concentrated by vacuum evaporation, for example, to achieve a supersaturated condition at a temperature below about 90° F. before contacting the seed crystals. The preferred procedure is to contact the dextrose solution which is in a saturated or undersaturated condition at a temperature above about 90° F. with a seed bed having a temperature substantially below about 90° F. so that the dextrose solution is substantially simultaneously cooled to a supersaturated condition and contacted with the seed crystals at a temperature below about 90° F.

The crystallization temperature should generally be in the range from about 70° F. (21° C.) to about 90° F. Preferably the crystallization temperature is in the range from about 70° F. to about 80° F. (27° C.).

The seed crystals employed in this process can be obtained in several ways. Preferably, the seed crystals are Phase I type formed under crystallization conditions at temperatures below about 90° F. and are present in the crystallizer for contact with the supersaturated dextrose solution. The seed crystals could also be formed through spontaneous nucleation by "shocking" a supersaturated dextrose solution at a temperature below about 90° F. This latter procedure is generally not satisfactory for production of relatively large size crystals since the seed crystals formed by spontaneous nucleation are usually quite small. Even though they may be the Phase I type that can eventually grow to large size, it will require a longer time to achieve the desired size as compared to a process using a seed crystal having a larger initial size.

The dextrose solutions employed in this process can be obtained from various sources. They could consist of aqueous solutions of pure dextrose prepared by dissolving slab dextrose or crystalline dextrose in water. Alternatively and preferably they are obtained by hydrolysis of starch employing acid or enzymes to convert the starch to dextrose, as is well known in the art. The resulting products will contain a mixture of dextrose and other starch-degradation products, such as maltose, maltotriose, higher saccharides and dextrins. The dextrose solution employed in this process should preferably contain from about 65 to about 85 weight percent dissolved carbohydrate solids and should have a high D.E. (Dextrose Equivalent). The D.E. is the amount of copper-reducing saccharides expressed as dextrose present in the dextrose solution. Generally the dextrose solution should have a D.E. greater than about 85.

In order to achieve adequate crystal growth and satisfactory yield of dextrose hydrate crystals, the dextrose solution should be in contact with the seed crystals at a temperature below about 90° F. for preferably from about 24 to about 48 hours. It is understood that crystallization times less than 24 hours and more than 48 hours can be employed, if desired.

At the conclusion of the crystallization procedure, the massecuite is removed from the crystallizer and the crystals are separated from the mother liquor by well-known techniques.

Substantially all of the prior art dextrose hydrate crystallization processes have been of the batch type. The process of the present invention can conveniently and preferably be employed continuously to produce relatively large crystals. In this form of the invention, a dextrose solution is continuously fed to a crystallizer where it contacts seed crystals under supersaturation conditions at a temperature under about 90° F. Massecuite is removed from the crystallizer at the same rate as the dextrose solution is fed to the crystallizer. The average residence time of the dextrose solution in the crystallizer is preferably from about 24 to about 48 hours, and it is maintained at a temperature below about 90° F. during this entire time.

When the crystals are recovered from the massecuite, a mother liquor stream is produced. This mother liquor stream contains all the non-crystallizable, non-dextrose components of the dextrose solution fed to the crystallizer as well as the dextrose which did not crystallize. The recovered crystals are also washed with water to remove any residual amounts of mother liquor from the crystals. This wash liquor stream also contains some dextrose. In prior art procseses, these mother liquor and wash liquor streams presented waste disposal problems since it was not generally commercially economical to try to recover the dextrose contained therein.

As an advance over the prior art, the present invention can employ the mother liquor and wash liquor streams in a recycle manner by blending them with the fresh dextrose solution to form a combined feed to the crystallizer. In order to prevent an undesirable build-up of non-crystallizable materials in the crystallizer when such recycle conditions are used, a minor portion of the mother liquor is removed as a purge stream before it is combined with the wash liquor.

In order to most effectively use the recycled mother liquor and wash liquor streams, these combined materials are concentrated, preferably by evaporation, to a level of from about 80 to about 85 weight percent dissolved carbohydrate solids before being added as part of the dextrose solution fed to the crystallizer.

The process of the present invention will be described in further detail in the following examples.

EXAMPLE 1

A dextrose hydrate seed bed was prepared as follows: a 10 gallon portion of a 65 weight percent aqueous dextrose solution was placed in a batch crystallized and slowly cooled from 86° F. (30° C.) to 78° F. (26° C.) to produce a massecuite mixture of dextrose hydrate crystals and mother liquor. Microscopic examination of the so-produced crystals indicated that they were of the distinctly pentagonal shape of Phase I, with no evidence of the undesirable lath-type Phase II form. A 5 gallon portion of the above seed bed was placed in another crystallized and maintained at 70° F. (21° C.). An aqueous solution of pure dextrose containing 68–75 weight percent dissolved solids and maintained at 120°–130° F. (49°–54° C.) to prevent formation of dextrose crystals was added in hourly increments to the seed bed at a rate of 4 gal. per day. When this dextrose feed solution was cooled to 70° F. in the crystallizer, it became supersaturated. After thorough mixing, corresponding amounts of the crystallizer contents were also removed in hourly increments. The temperature of the crystallizer contents was maintained at 70° F. The average residence time in the crystallizer, once equilibrium conditions were achieved, was 30 hours. The above procedure was continued for 5 days. The material withdrawn from the crystallizer was centrifuged to separate the crystals from the mother liquor. The dextrose hydrate crystals recovered amounted to about 56.6–57.5 weight percent of the dextrose contained in the material fed to the crystallizer, not counting the dextrose in the seed bed. The product crystals were of Phase I and had an average thickness of about 60 microns, which is at least three times the average thickness of previous commercially available dextrose hydrate crystals.

EXAMPLE 2

A crystallizer was charged with 5 gallons of the crystal mother liquor mixture obtained in Example 1 above for use as a seed bed. The crystallizer contents were maintained at 70° F. while a syrup prepared from an enzyme hydrolyzed sorghum flour which had been refined by ion exchange was introduced at an hourly incremental rate of 5 gallons per day. This syrup contained 68 weight percent dissolved solids and had a Dextrose Equivalent of 98.7. It became a supersaturated solution when cooled to 70° F. in the crystallizer. After thorough mixing, corresponding amounts of the crystallizer contents were also removed in hourly increments. The above procedure was continued for 5 days. The average residence time in the crystallizer, once equilibrium conditions were achieved, was 24 hours. The material withdrawn from the crystallizer was centrifuged to separate the crystals from the mother liquor. The dextrose hydrate crystals recovered amounted to 48.0–64.7 weight percent of the dextrose charged to the crystallizer. The product crystals were all of Phase I and had a desirably large size.

EXAMPLE 3

The procedure of Example 2 was repeated employing a feed syrup containing 72 weight percent dissolved solids and a feed rate of 2.5 gallons per day. This procedure was continued for several days with an average residence time of 48 hours. The yield of dextrose hydrate crystals was 56.5–61.4 weight percent. The product crystals had desirably large size.

EXAMPLE 4

A 50 gallon cylindrical jacketed batch crystallizer with slowly turning horizontal helical agitator was modified for continuous operation. A semi-circular dam having a notch as a spillway was mounted vertically across the crystallizer between the agitator and one end of the crystallizer above the discharge port. This dam was cut to fit slightly below the horizontal agitator shaft. The volume of the semi-cylindrical space up to the top of the dam was 16 gallons. The seed bed for the crystallizer was prepared by introducing through an inlet port located at the opposite end of the crystallizer from the discharge port a mixture of Phase I dextrose hydrate crystals and dilute dextrose solution having an overall mixture dry substance content of 70 weight percent. This mixture was agitated in the crystallizer overnight at 73°–74° F. (23° C.). Dextrose feed solution containing 70 weight percent dissolved solids, which had been stored at 120°–130° F. to prevent crystallization, was added to the crystallizer in small increments until the 16 gallon capacity of the crystallizer was filled. The crystallizer contents were maintained at 73°–74° F.

The above dextrose feed solution was previously prepared in the following manner. Refined corn starch (360 lb.) was mixed with 600 lb. of water to form about 100 gallons of starch slurry. To this slurry were added 327 grams of sodium chloride and 436 grams of 75% calcium chloride to form a sodium molarity content in the slurry of about 0.02 and a calcium molarity content in the slurry of about 0.01. The pH of the slurry was adjusted to 6.2 and 0.0275 weight percent, based on dry solids in the slurry, of alpha amylase having a potency of 3800 SKB units/gram was added. The resulting mixture was pasted by passing through a steam jet mixer at 325° F. (163° C.). The gelatinized starch mixture was flash-cooled to 210°–212° F. (99°–100° C.) and 0.055 weight percent alpha-amylase was continuously metered into the starch stream as it was collected in a heat-jacketed kettle. The temperature of the kettle contents was maintained at 208°–210° F. (98°–99° C.) for 30 min. The temperature was then reduced to 185° F. (85° C.) and 0.055 weight percent alpha-amylase was added. The temperature was maintained at 185° F. for 120 min. to produce a liquefied starch syrup having a Dextrose Equivalent of about 14. The resulting starch syrup was filtered. The filtrate was cooled to 135° F. (57° C.) and its pH adjusted to 4.5. A 0.5 weight percent, based on weight of dissolved solids in the syrup, portion of amyloglucosidase was added and the temperature was maintained at 135° F. for 95 hours to produce a saccharified starch syrup having a Dextrose Equivalent of about 96–97. This syrup was then refined by well-known carbon and ion-exchange treatment. It was then concentrated by evaporation to 70 weight percent dissolved solids and polish filtered.

The above prepared dextrose feed solution, stored at 120°–130° F., was then continuously fed to the crystallizer containing the above seed bed at a rate of 0.44 gallon per hour. This dextrose feed solution became supersaturated when cooled in the crystallizer. Crystalline massecuite was then continuously discharged from the crystallizer over the spillway in the dam and out through the discharge port at the same rate. The average residence time in the crystallizer, once equilibrium conditions were achieved, was about 36–38 hours. This procedure was continued for 21 days during which time the crystallizer contents were maintained in the range from 73° to 79° F. (23°–26° C.).

The massecuite discharged from the crystalizer was fed to a centrifuge where the crystals were separated from the mother liquor. The recovered crystals were also washed with water to form a wash liquor. The mother liquor and wash liquor were combined and fed to a wiped-film evaporator where they were concentrated to a level of 80–84 weight percent dissolved solids. This concentrated material was then blended into the fresh dextrose solution to be fed into the crystallizer. The amount of fresh dextrose solution was reduced to compensate for this recycled material so as to maintain the above feed rate of 0.44 gallon per hour. On the twenty-second day of of operation the fresh dextrose solution was changed to a composition of 94 D.E., and it was blended with the concentrated mother liquor and wash liquor recycle material fed to the crystallizer. This operation was continued for a total of 28 days. The combined crystallizer feed was gradually reduced from about 96 D.E. to about 87–88 D.E. over the entire run and the concentration gradually increased from 70 to 75 weight percent dissolved solids. This was done to maintain a substantially constant yield of dextrose hydrate crystals. The yield of dextrose hydrate crystals was 46.7 weight percent based on dextrose fed to the centrifuge separator. The yield of dextrose hydrate crystals based on fresh dextrose charged to the crystallizer was 87.8 weight percent. About 12 weight percent of the total dextrose charged to the crystallizer was lost in a mother liquor purge stream to remove non-crystallizable materials which had built up in the system. All of the recovered dextrose hydrate crystals were of Phase I type and substantially all were of desirably large size.

The crystals produced in the above process were easily dewatered when centrifuged. The resulting wet crystals formed a very loosely packed centrifuge cake which could be easily broken without the presence of lumps. It was thus easily washed. The resulting washed centrifuge cake contained only 5.4 weight percent free water which is an advantage in subsequent drying and screening steps for the eventual production of dry crystals.

In addition to producing desirably large crystals, the above process can employ a relatively short crystallization time of preferably about 24–48 hours as compared to the relatively long prior art crystallization time of about 96–120 hours.

What is claimed is:

1. A process for the production of relatively large crystals of dextrose hydrate which comprises contacting a supersaturated solution of dextrose with dextrose hydrate seed crystals at a temperature below about 90° F., maintaining the temperature of the dextrose solution in contact with the seed crystals below about 90° F. during dextrose crystallization to form a massecuite and recovering crystals of dextrose hydrate from such massecuite.

2. A process according to claim 1 wherein the crystallization temperature is from about 70° F. to about 80° F.

3. A process according to claim 1 wherein the dextrose solution raw material contains from about 65 to about 85 weight percent dissolved carbohydrate solids.

4. A process according to claim 1 wherein the dextrose solution raw material is produced by hydrolysis of starch.

5. A process according to claim 1 wherein contact is maintained between the dextrose solution and the seed crystals for from about 24 to about 48 hours.

6. A process according to claim 1 wherein the dextrose hydrate seed crystals are of the Phase I type.

7. A process according to claim 6 wherein said Phase I seed crystals are of the type formed under crystallization conditions at temperatures below about 90° F.

8. A process according to claim 1 for the continuous production of relatively large crystals of dextrose hydrate which comprises continuously feeding a dextrose solution containing from about 65 to about 85 weight percent dissolved carbohydrate solids to a crystallizer where such dextrose solution is contacted with dextrose hydrate seed crystals at a temperature below about 90° F., maintaining contact between the dextrose solution and the seed crystals at a temperature below about 90° F. for from about 24 to about 48 hours to form a massecuite consisting of a mixture of dextrose hydrate crystals and mother liquor, continuously discharging said massecuite from said crystallizer, and separating the dextrose hydrate crystals from said mother liquor.

9. A process according to claim 8 wherein the dextrose hydrate crystals separated from said mother liquor are washed with water to form a wash liquor, and the dextrose hydrate crystals are separated from said wash liquor.

10. A process according to claim 9 wherein the wash liquor and the mother liquor, both individually separated from the dextrose hydrate crystals, are combined and recycled to form a part of the dextrose solution fed to the crystallizer.

11. A process according to claim 10 wherein the combined wash liquor and mother liquor is concentrated to a level of from about 80 to about 85 weight percent dissolved carbohydrate solids before being added as a part of the dextrose solution fed to the crystallizer.

References Cited
UNITED STATES PATENTS

| | | | |
|---|---|---|---|
| 1,693,118 | 11/1928 | Newkirk | 127—61X |
| 3,257,665 | 6/1966 | Idaszak | 127—60 |
| 3,506,486 | 4/1970 | Ganiaris | 127—58 |

MORRIS O. WOLK, Primary Examiner

S. MARANTZ, Assistant Examiner

U.S. Cl. X.R.

127—62